United States Patent
Azenkot et al.

(10) Patent No.: US 11,962,439 B2
(45) Date of Patent: Apr. 16, 2024

(54) FAST EQUALIZATION FOR JITTER MITIGATION

(71) Applicant: MACOM Technology Solutions Holdings, Inc., Lowell, MA (US)

(72) Inventors: Yehuda Azenkot, San Jose, CA (US); Georgios Takos, Mountian View, CA (US); Bart R Zeydel, Fair Oaks, CA (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 17/440,159

(22) PCT Filed: Mar. 20, 2020

(86) PCT No.: PCT/US2020/023802
§ 371 (c)(1),
(2) Date: Sep. 16, 2021

(87) PCT Pub. No.: WO2020/191273
PCT Pub. Date: Sep. 24, 2020

(65) Prior Publication Data
US 2022/0158876 A1 May 19, 2022

Related U.S. Application Data

(60) Provisional application No. 62/821,348, filed on Mar. 20, 2019.

(51) Int. Cl.
*H04L 25/03* (2006.01)

(52) U.S. Cl.
CPC .............. *H04L 25/03063* (2013.01)

(58) Field of Classification Search
CPC .................................. H04L 25/03063
USPC .................................. 375/232–236
See application file for complete search history.

(56) References Cited

U.S. PATENT DOCUMENTS

| | | | |
|---|---|---|---|
| 7,532,697 B1 * | 5/2009 | Sidiropoulos | H04L 7/033 375/376 |
| 9,450,788 B1 * | 9/2016 | Cops | H04L 25/03057 |
| 2004/0042545 A1 * | 3/2004 | Han | H04L 25/03057 375/232 |
| 2004/0203542 A1 * | 10/2004 | Seo | H04B 1/0475 455/127.1 |
| 2005/0271169 A1 | 12/2005 | Momtaz et al. | |

(Continued)

FOREIGN PATENT DOCUMENTS

CN 101616107 12/2009

*Primary Examiner* — Don N Vo

(57) ABSTRACT

A system for receiving signals transmitted via serial links includes an equalizer for accessing a digitized communications signal and producing an equalized output signal, and a fast equalization module for determining output data corresponding to the communications signal. The fast equalization module includes a filter to access an output of the equalizer, a slicer module to access an output of the filter and produce a data output corresponding to the communications signal, a lookup table to provide filtering coefficients to the filter, and a coefficient improvement module to improve the coefficients based on an error signal from the filter. The coefficient improvement module is configured to update the coefficients in the lookup table.

19 Claims, 4 Drawing Sheets

(56) References Cited

U.S. PATENT DOCUMENTS

| | | | |
|---|---|---|---|
| 2007/0147491 A1* | 6/2007 | Casper | H04L 25/03885 375/232 |
| 2008/0240325 A1 | 10/2008 | Agazzi et al. | |
| 2008/0260017 A1 | 10/2008 | Tsuie et al. | |
| 2011/0211842 A1* | 9/2011 | Agazzi | H04L 25/0202 398/141 |
| 2013/0294493 A1 | 11/2013 | Kono et al. | |
| 2019/0081834 A1* | 3/2019 | de Ruijter | H04L 27/0014 |
| 2019/0109735 A1* | 4/2019 | Norimatsu | H04L 25/03 |
| 2019/0238152 A1* | 8/2019 | Pagnanelli | H03M 3/51 |
| 2019/0296944 A1* | 9/2019 | Shiraishi | H04L 25/03057 |

* cited by examiner

FAST EQUALIZATION FOR JITTER MITIGATION

RELATED APPLICATION

This application claims priority to U.S. Provisional Application 62/821,348, "Digital Interpolation for Jitter Migration," to Azenkot et al., filed Mar. 20, 2019, which is hereby incorporated herein by reference in its entirety.

FIELD OF INVENTION

Embodiments of the present invention relate to the field of communications signal processing. More specifically, embodiments of the present invention relate to systems and methods for Fast Equalization for Jitter Mitigation.

BACKGROUND

A typical communications link may include a PAM-4 (Pulse Amplitude Modulation with 4 levels) transmitter and receiver in conjunction with an optical transmitter and/or receiver. Frequently, an optical transmitter drives an MZI (Mach-Zehnder-Interferometer) optical modulator. A received optical signal is usually converted to electrical signals via a photo detector.

In one example, the data rate can be 53.125 GBaud, which supports about 100 Gbps for PAM-4 modulation.

Generally, an ADC (Analog to Digital Converter) samples the received signal at full rate of 53.125 GHz. Then an equalizer compensates for some distortions that the received signal incurred through the channel. Then a slicer makes decisions on the PAM-4 symbols.

Receivers of digital data typically have timing recovery loop, or CDR (clock data recovery) functions that extract timing information from the serial data stream to allow the receiver to sample the data at the right time. The timing recovery loop may include a phase detector (PD), a loop filter (LF) and phase interpolator (PI) and/or a VCO. The phase detector may be based on a Mueller-Muller algorithm where the received symbols are sampled at one sample/symbol. The phase interpolator outputs a clock which is at the full baud rate of 53.125 GHz. The phase interpolator clock drives the ADC that samples the input analog signal at the baud rate.

The timing recovery should track and remove any jitter that the received data incurred. However, the timing recovery can only track jitter with frequencies below the bandwidth of the timing recovery loop. Any jitter at frequencies above the timing recovery bandwidth can have a detrimental effect on the performance of the receiver especially in high data rates. Reducing the jitter of the analog components is a challenging issue.

SUMMARY OF THE INVENTION

Therefore, what is needed are systems and methods for fast equalization for jitter mitigation. What is additionally needed are systems and methods for fast equalization for jitter mitigation that can overcome the effects of high frequency jitter which cannot be tracked by a timing recovery subsystem. There is a further need for systems and methods for fast equalization for jitter mitigation that are compatible and complementary with existing systems and methods of clock recovery in communication receivers.

In accordance with an embodiment of the present invention, a system for receiving signals transmitted via serial links includes an equalizer (130) for accessing a digitized communications signal and producing an equalized output signal, and a fast equalization module (110) for determining output data corresponding to the communications signal. The fast equalization module includes a filter (210) to access an output of the equalizer (130), a slicer module (220) to access an output of the filter (210) and produce a data output corresponding to the communications signal, a lookup table (230) to provide filtering coefficients to the filter (210), and a coefficient improvement module (250) to improve the coefficients based on an error signal from the filter (210). The coefficient improvement module (250) is configured to update the coefficients in the lookup table (230).

In accordance with another embodiment of the present invention, a system for receiving a data signal transmitted via serial links includes a timing recovery loop. The timing recovery loop includes an analog to digital converter (120) coupled to the output of a media receiver (180), an equalizer (130) coupled to an output of the digital converter (120), a slicer (140) coupled to an output of the equalizer (130). A phase detector (170) coupled to the output of the slicer (140), a loop filter (160) coupled to the output of the phase detector (170), and a phase interpolator (150) coupled to the output of the loop filter (160). The phase interpolator (150) provides a clock signal input to the analog to digital converter (120) to trigger sampling of the output of the media receiver (180). The system for receiving a data signal transmitted via serial links includes a fast equalizer, coupled to the timing recovery loop. The fast equalizer includes a filter (210) coupled to an output of the equalizer (130) and configured to receive filter coefficients from a lookup table (230), and a coefficient improver (250) coupled to an output of the equalizer (130) and configured to receive an error signal from the filter (210). The coefficient improver (250) is further configured to update filter coefficients in the lookup table (230). The fast equalizer also includes a low pass filter (240) coupled to an output of the phase detector (170) and configured to provide an index address to the lookup table (230) to select the filter coefficients for use by the filter (210), and a slicer 220 coupled to an output of the filter (210) and providing a data output signal corresponding to the data signal.

In accordance with a method embodiment of the present invention, equalized data is filtered to produce filtered data. The filtered data is sliced to produce a data signal corresponding to the received serial communication. The coefficients may be improved based on an error signal from the filter, and the improved coefficients may update those stored in the lookup table. The coefficients from the lookup table may be accessed based on an index address provided by a low pass filter

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings may not be drawn to scale.

DETAILED DESCRIPTION

Reference will now be made in detail to various embodiments of the invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations performed by electronic devices and/or circuits. These descriptions and representations are the means used by those skilled in the electronic arts to most effectively convey the substance of their work to others skilled in the art. In the present application, a procedure, a method, logic block, process, or the like, is conceived to be a self-consistent sequence of operations or instructions leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing terms such as "filtering," "slicing," "improving," "updating," "accessing," or the like, refer to actions and processes (e.g., method 400 of FIG. 4) of electronic devices and/or electronic circuits, including, for example, integrated circuits.

Fast Equalization for Jitter Mitigation

Figure 1:
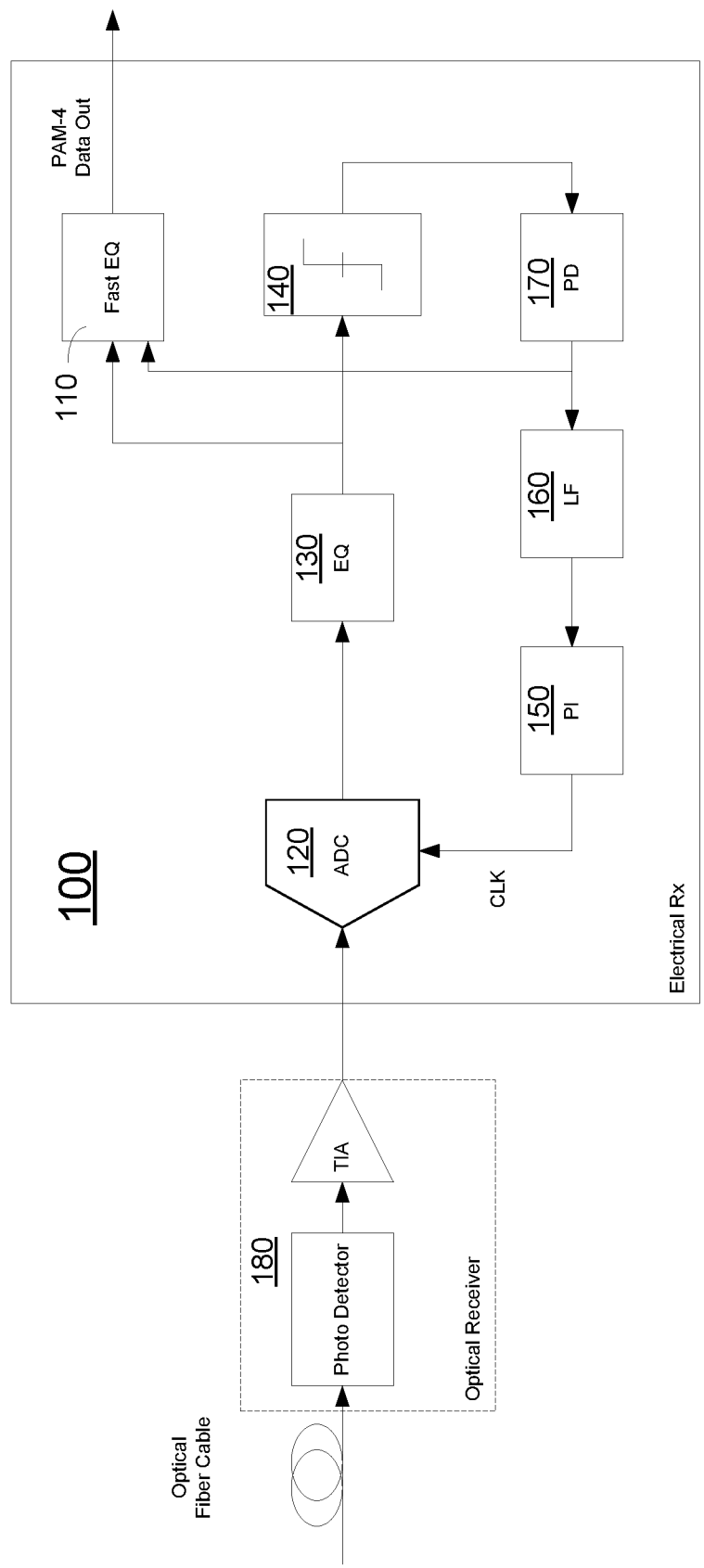
FIG. 1 illustrates a block diagram of a system for Fast Equalization for Jitter Mitigation, in accordance with embodiments of the present invention

FIG. 1 illustrates a block diagram of a system 100 for Fast Equalization for Jitter Mitigation, in accordance with embodiments of the present invention. System 100 is typically coupled to an optical receiver to receive electrical signals corresponding to optical signals transmitted over, for example, an optical fiber. It is appreciated, however, that embodiments in accordance with the present invention are well suited to serial communications transmitted over any medium, including, for example, wire communications and/or Radio Frequency (RF) communications.

System 100 receives electrical signals from a receiver, e.g., the illustrated optical communications receiver 180. The PAM-4 received data is converted to the digital domain via an ADC (Analog to Digital Converter) 120. ADC 120 may sample the received signal at full rate of, for example, 53.125 GHz. The sampling rate of the received signal may be 1 sample per symbol. A T-spaced equalizer (EQ) 130, based on FFE and/or DFE, equalizes the received signal. The equalizer 130 renders a flat frequency response in the signal and output an equalized signal. The equalizer 130 may also include a feedback filter.

In order to handle a high sampling rate, the ADC 120 may output, for example, 64 samples in parallel. A timing recovery loop estimates the optimal sampling point generating the proper clock (CLK) that samples the received signal at the ADC 100. The output of equalizer 130 is fed to slicer 140, which estimates the PAM-4 symbols. The second-order timing recovery loop consists of Mueller-Muller-based phase detector (PD) 170, loop filter (LF) 160 and a phase interpolator (PI) 150 (or voltage-controlled oscillator (VCO)). It is appreciated that the loop filter 160 is phase based, rather than filtering data. Elements ADC 120, equalizer 130, slicer 140, phase detector 170, loop filter 160 and phase interpolator 150 form a timing recovery loop. The bandwidth of the timing recovery loop will generally be limited, for example, to 4 MHz, due to the finite processing time, e.g., "latency," of the components forming the loop.

In accordance with embodiments of the present invention, a fast equalizer 110 is added to the blocks previously described. In general, fast equalizer 110 implements a data-based filter based on coefficients stored in a lookup table. Beneficially, the coefficients are updated based on an error signal from the filter. Accordingly, the received signal is sampled at improved timing locations. Advantageously, the effect of clock jitter is reduced beyond a timing recovery bandwidth of a timing recovery loop, enabling a desirable reduced bit error rate in the received signal.

Figure 2:
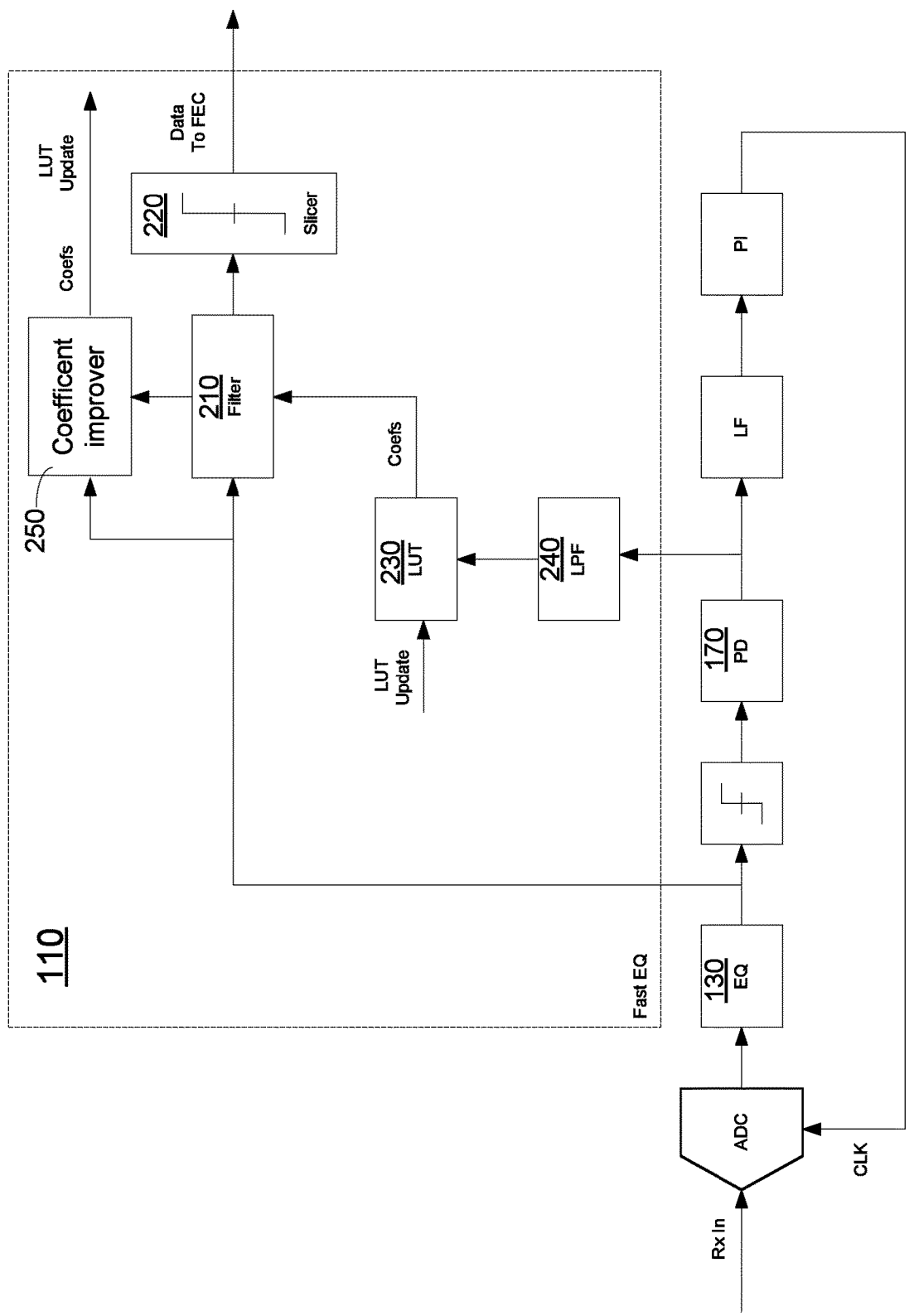
FIG. 2 illustrates a block schematic of a Fast Equalizer, in accordance with embodiments of the present invention.

FIG. 2 illustrates a block schematic of a Fast Equalizer 110, in accordance with embodiments of the present invention.

The equalizer (EQ) 120 outputs 64 samples in parallel which are further processed by the filter 210 of the fast EQ 110. In contrast to loop filter 160 (FIG. 1), filter 210 is a data filter. The output of the filter 210 is passed through a PAM-4 slicer 220 outputting the decisions of the data to a FEC (forward error correction) decoder (not shown). The filter 210 may be a finite impulse response (FIR)-based filter utilizing 5 coefficients. In general, the filter 210 interpolates the signal at phase offset based on 5 samples. The filter coefficients are retrieved from the LUT (look-up table) 230 based on the averaged phase offset of the 64 data samples. The LUT 230 has, for example, 128 sets of coefficients, where each set has 5 coefficients. The coefficients are a function of phase offset. The LUT 230 index or address is generated based on the average of 64 phase offsets obtained from the PD (phase detector) 170. The averaging of the 64 PD outputs is done via a low-pass filter (LPF) 240 that can be implemented via a simple finite impulse response (FIR) filter. The samples, e.g., 64 samples, obtained from the EQ are processed by the coefficient improver module 250 to generate a better equalized-coefficients which are written back into the LUT 230 at the appropriate LUT 230 address for future use.

Relation 1, below, is an exemplary least mean square process, for example, implemented in coefficient improver 250, in accordance with embodiments of the present invention.

$$C_{k+1}(i) = C_k(i) + \mu \cdot \sum_{i=1}^{64} e_k^j \cdot r_k^j(i), \quad i = 1, \ldots, 5 \qquad \text{(Relation 1)}$$

For the time index k, 64 values of the error, $e_k^j$, j=1, ..., 64, are calculated for the same set of 5 coefficients $C_k(i)$, i=1, ..., 5, and the appropriate samples of the input $r_k$. Then, the 64 errors are multiplied by the appropriate input samples, r, and summed. Then, after multiplying by the step parameter, μ, the 5 corrections to the 5 coefficients are added to obtain the updated 5 coefficients, $C_{k+1}(i)$ for i=1, ..., 5.

Table 1, below, illustrates exemplary values of 5-tap FIR coefficients, in accordance with embodiments of the present invention.

TABLE 1

| Default | 0 | 0 | 1 | 0 | 0 |
|---|---|---|---|---|---|
| Exemplary | −0.01 | 0.062 | 1 | −0.06 | 0.01 |

The LMS duration may extend to more than one cycle, e.g., for 5 cycles.

Figure 3:
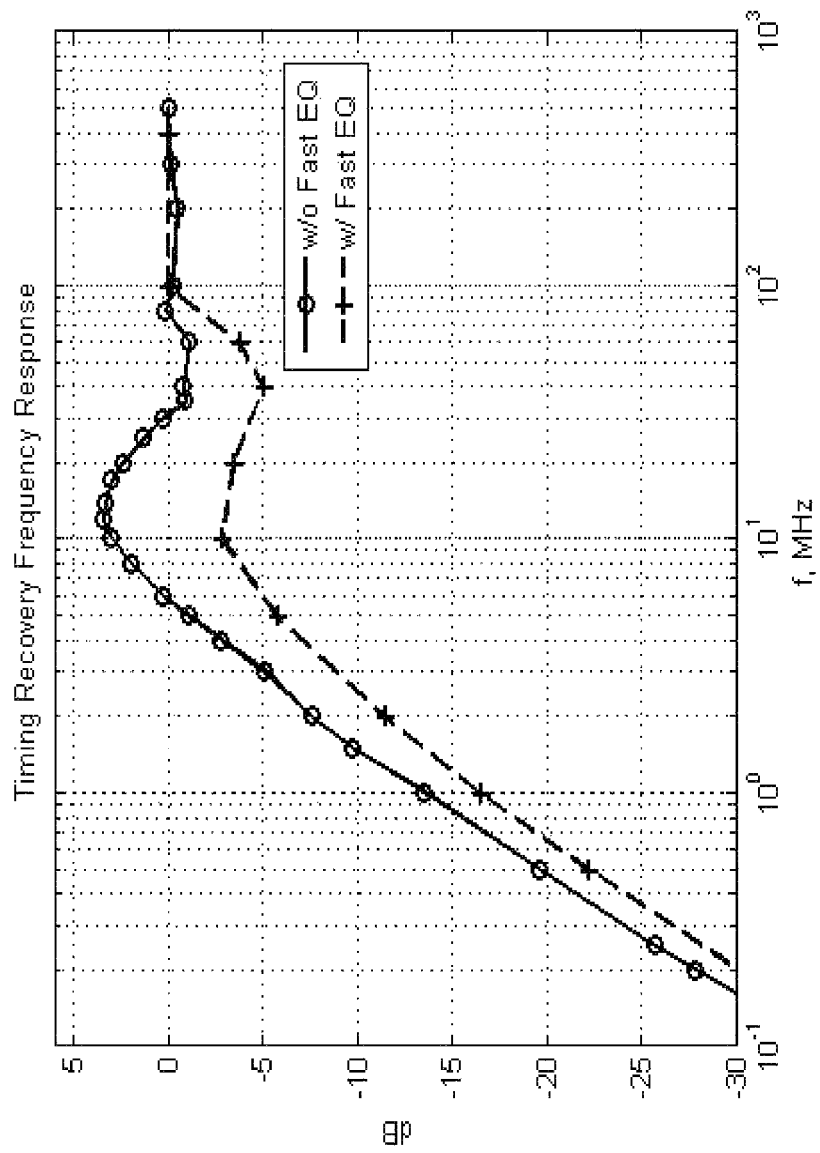
FIG. 3 illustrates a comparison of frequency response of timing jitter for embodiments in accordance with the present invention in comparison to the conventional art.

FIG. 3 illustrates a comparison of frequency response of timing jitter for embodiments in accordance with the present invention in comparison to the conventional art. The vertical axis is jitter gain in dB, while the horizontal axis is logarithmic frequency of the jitter in MHz. The top curve represents the conventional art, while the lower curve illustrates embodiments in accordance with the present invention. A difference between the two curves at a given frequency illustrates the improved timing recovery of embodiments in accordance with the present invention. For example, at 40 MHz, embodiments in accordance with the present invention are approximately 5 dB better than the exemplary convention art system.

As illustrated in FIG. 3, the jitter at frequencies up to 100 MHz is attenuated under embodiments in accordance with the present invention. It is appreciated that above about 6 MHz, the conventional art (top curve) actually amplifies jitter, e.g., the jitter gain value is greater than zero dB. Notably, with the novel fast EQ block 110 (FIGS. 1 and 2), the jitter frequencies above the timing recovery bandwidth of 4 MHz is significantly attenuated relative to a conventional receiver without the incorporation of the novel fast EQ block 110. This enables the receiver to achieve an advantageous low bit error rate (BER).

Figure 4:
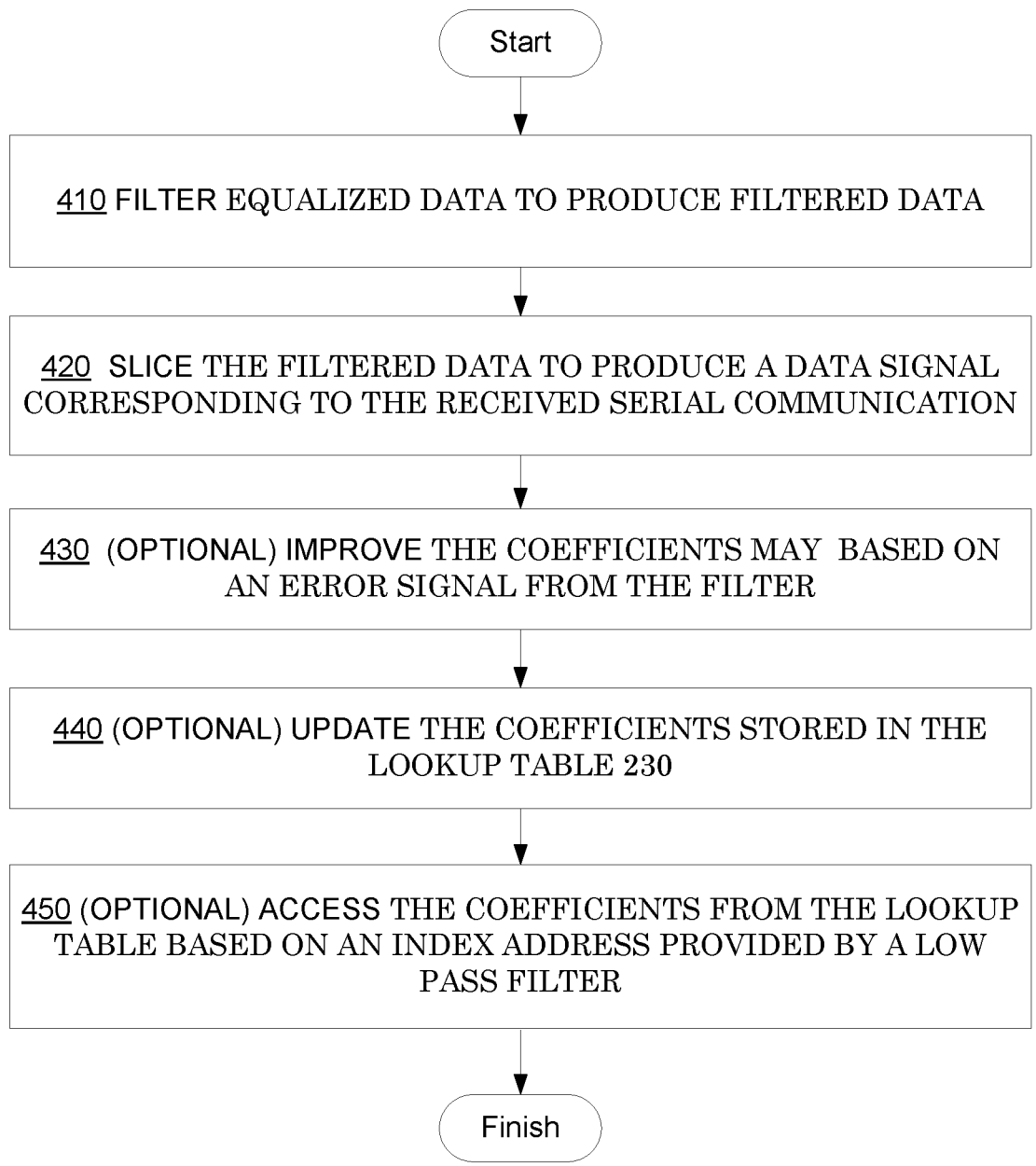
FIG. 4 illustrates a method of fast equalization for mitigating jitter in clock signals recovered from received serial commutation, in accordance with embodiments of the present invention.

FIG. 4 illustrates a method 400 of fast equalization for mitigating jitter in clock signals recovered from received serial communication, in accordance with embodiments of the present invention.

In 410, equalized data is filtered to produce filtered data. The filtering may be performed, for example, by filter 210 of FIG. 2. The filtering may be based on coefficients accessed from a lookup table, e.g., based on coefficients accessed from lookup table 230 of FIG. 2. In 420, the filtered data is sliced to produce a data signal corresponding to the received serial communication. The slicing may be performed, for example, by slicer 220 of FIG. 2.

In optional 430, the coefficients may be improved based on an error signal from the filter, e.g., filter 210 of FIG. 2. The improvement may be performed by coefficient improver 250, for example. Coefficient improver 250 may implement a least mean square process, for example. In optional 440, the coefficients stored in the lookup table, e.g., lookup table 230 of FIG. 2, may be updated. In optional 450, the coefficients from the lookup table, e.g., lookup table 230 of FIG. 2, may be accessed based on an index address provided by a low pass filter, e.g., low pass filter 240.

Concepts disclosed herein include:
Concept 1. A system for receiving signals transmitted via serial links, comprising:
  an equalizer (130) for accessing a digitized communications signal and producing an equalized output signal;
  a fast equalization module (110) for determining output data corresponding to said communications signal, said fast equalization module comprising:
    a filter (210) to access an output of said equalizer (130);
    a slicer module (220) to access an output of said filter (210) and produce a data output corresponding to said communications signal;
    a lookup table (230) to provide filtering coefficients to said filter (210); and
    a coefficient improvement module (250) to improve said coefficients based on an error signal from said filter (210), wherein
    said coefficient improvement module (250) is configured to update said coefficients in said lookup table (230).
Concept 2. The system of Concept 1 further comprising a low pass filter (240) for accessing an output of a phase detector (170) to provide an index address to said lookup table (230) for selecting said filtering coefficients.
Concept 3. The system of Concept 2 wherein said low pass filter (240) averages phase offset based on 64 data samples.
Concept 4. The system of Concept 1 wherein said coefficient improvement module (250) implements a least mean square process.
Concept 5. The system of Concept 1 further comprising a second slicer (140) outside of said fast equalization module (110) for producing an output used only internally to said system for receiving signals.
Concept 6. The system of Concept 1 wherein said equalizer (130) accesses 64 parallel outputs from an analog to digital converter (120).
Concept 7. The system of Concept 1 wherein jitter at frequencies above the timing recovery bandwidth of a timing recovery loop is decreased.
Concept 8 A system for receiving a data signal transmitted via serial links, comprising:
  a timing recovery loop comprising:
    an analog to digital converter (120) coupled to the output of a media receiver (180);
    an equalizer (130) coupled to an output of the digital converter (120);
    a slicer (140) coupled to an output of the equalizer (130);
    a phase detector (170) coupled to the output of the slicer (140);
    a loop filter (160) coupled to the output of the phase detector (170);
    phase interpolator (150) coupled to the output of the loop filter (160),
    wherein the phase interpolator (150) provides a clock signal input to the analog to digital converter (120) to trigger sampling of the output of the media receiver (180);
  a fast equalizer, coupled to the timing recovery loop, comprising:
    a filter (210) coupled to an output of the equalizer (130) and configured to receive filter coefficients from a lookup table (230);

a coefficient improver (250) coupled to an output of the equalizer (130) and configured to receive an error signal from the filter (210),
wherein the coefficient improver (250) is further configured to update filter coefficients in the lookup table (230);
a low pass filter (240) coupled to an output of the phase detector (170) and configured to provide an index address to the lookup table (230) to select the filter coefficients for use by the filter (210); and
a slicer 220 coupled to an output of the filter (210) and providing a data output signal corresponding to the data signal.

Concept 9. The system of Concept 8 wherein said low pass filter (240) averages phase offset based on 64 data samples.

Concept 10. The system of Concept 8 wherein said coefficient improvement module (250) implements a least mean square process.

Concept 11. The system of Concept 8 any output of the slicer (140) is used only internally to the timing recovery loop.

Concept 12. The system of Concept 8 wherein the analog to digital converter (120) produces 64 outputs in parallel.

Concept 13. The system of Concept 8 wherein the phase detector (170) implements a Mueller-Muller algorithm.

Concept 14. The system of Concept 8 wherein jitter at frequencies above the timing recovery bandwidth of the timing recovery loop is decreased.

Concept 15. A method of fast equalization for mitigating jitter in clock signals recovered from received serial communication, the method comprising:
filtering equalized data to produce filtered data; and
slicing the filtered data to produce a data signal corresponding to the received serial communication.

Concept 16. The method of Concept 15 wherein the filtering is based on coefficients accessed from a lookup table (230).

Concept 17. The method of Concept 16 further comprising:
improving the coefficients based on an error signal from the filter.

Concept 18. The method of Concept 17 further comprising:
updating the coefficients in the lookup table (230).

Concept 19. The method of Concept 16 further comprising:
accessing the coefficients from the lookup table (230) based on an index address provided by a low pass filter (240).

Concept 20. The method of Concept 15 wherein jitter at frequencies above a timing recovery bandwidth of a timing recovery loop is decreased.

Embodiments in accordance with the present invention provide systems and methods for fast equalization for jitter mitigation. In addition, embodiments in accordance with the present invention provide systems and methods for fast equalization for jitter mitigation that can overcome the effects of high frequency jitter which cannot be tracked by a timing recovery subsystem. Further, embodiments in accordance with the present invention provide systems and methods for fast equalization for jitter mitigation that are compatible and complementary with existing systems and methods of clock recovery in communication receivers.

Various embodiments of the invention are thus described. While the present invention has been described in particular embodiments, it should be appreciated that the invention should not be construed as limited by such embodiments, but rather construed according to the below claims.

What is claimed is:

1. A system for receiving signals transmitted via serial links, comprising:
an equalizer for accessing a digitized communications signal and producing an equalized output signal;
a fast equalization module for determining output data corresponding to said digitized communications signal, said fast equalization module comprising:
a filter to access an output of said equalizer;
a slicer module to access an output of said filter and produce a data output corresponding to said digitized communications signal;
a lookup table to provide filtering coefficients to said filter; and
a coefficient improvement module to improve said coefficients based on an error signal from said filter, wherein
said coefficient improvement module is configured to update said coefficients in said lookup table.

2. The system of claim 1 further comprising a low pass filter for accessing an output of a phase detector to provide an index address to said lookup table for selecting said filtering coefficients.

3. The system of claim 2 wherein said low pass filter averages phase offset based on 64 data samples.

4. The system of claim 1 wherein said coefficient improvement module implements a least mean square process.

5. The system of claim 1 further comprising a second slicer outside of said fast equalization module for producing an output used only internally to said system for receiving signals.

6. The system of claim 1 wherein said equalizer accesses 64 parallel outputs from an analog to digital converter.

7. The system of claim 1 wherein jitter at frequencies above the timing recovery bandwidth of a timing recovery loop is decreased.

8. A system for receiving a data signal transmitted via serial links, comprising:
a timing recovery loop comprising:
an analog to digital converter coupled to the output of a media receiver;
an equalizer coupled to an output of the digital converter;
a slicer coupled to an output of the equalizer;
a phase detector coupled to the output of the slicer;
a loop filter coupled to the output of the phase detector;
a phase interpolator coupled to the output of the loop filter,
wherein the phase interpolator provides a clock signal input to the analog to digital converter to trigger sampling of the output of the media receiver;
a fast equalizer, coupled to the timing recovery loop, comprising:
a filter coupled to an output of the equalizer and configured to receive filter coefficients from a lookup table;
a coefficient improver coupled to an output of the equalizer and configured to receive an error signal from the filter,
wherein the coefficient improver is further configured to update filter coefficients in the lookup table;
a low pass filter coupled to an output of the phase detector and configured to provide an index address to the lookup table to select the filter coefficients for use by the filter; and a slicer coupled to an output of the filter and providing a data output signal corresponding to the data signal.

9. The system of claim 8 wherein said low pass filter averages phase offset based on 64 data samples.

10. The system of claim 8 wherein said coefficient improvement module implements a least mean square process.

11. The system of claim 8 any output of the slicer is used only internally to the timing recovery loop.

12. The system of claim 8 wherein the analog to digital converter produces 64 outputs in parallel.

13. The system of claim 8 wherein the phase detector implements a Mueller-Muller algorithm.

14. The system of claim 8 wherein jitter at frequencies above the timing recovery bandwidth of the timing recovery loop is decreased.

15. A method of fast equalization for mitigating jitter in clock signals recovered from received serial communication, the method comprising:

filtering equalized data to produce filtered data,
wherein the filtering utilizes filtering coefficients accessed from a lookup table;
accessing the filtering coefficients from the lookup table utilizing an index address provided by a low pass filter; and
slicing the filtered data to produce a data signal corresponding to the received serial communication.

16. The method of claim 15 wherein an input of the low pass filter is coupled to the output of a phase detector.

17. The method of claim 15 further comprising:
improving the coefficients based on an error signal from the filter.

18. The method of claim 17 further comprising:
updating the coefficients in the lookup table.

19. The method of claim 15 wherein jitter at frequencies above a timing recovery bandwidth of a timing recovery loop is decreased.

* * * * *